(12) United States Patent
Badoni et al.

(10) Patent No.: US 10,838,042 B2
(45) Date of Patent: Nov. 17, 2020

(54) SCANNING LIDAR SYSTEM USING A CURVED ROTATING SURFACE

(71) Applicants: Vipul Dutt Badoni, San Jose, CA (US); Michael Patrick Lenihan, Cupertino, CA (US); Michael John Henderson, Grass Valley, CA (US); Boping Xie, San Ramon, CA (US); Michael V Morelli, San Jose, CA (US); Randy Goettsch, San Jose, CA (US)

(72) Inventors: Vipul Dutt Badoni, San Jose, CA (US); Michael Patrick Lenihan, Cupertino, CA (US); Michael John Henderson, Grass Valley, CA (US); Boping Xie, San Ramon, CA (US); Michael V Morelli, San Jose, CA (US); Randy Goettsch, San Jose, CA (US)

( * ) Notice: Subject to any disclaimer, the term of this patent is extended or adjusted under 35 U.S.C. 154(b) by 425 days.

(21) Appl. No.: 15/817,285

(22) Filed: Nov. 20, 2017

(65) Prior Publication Data

US 2018/0143301 A1    May 24, 2018

Related U.S. Application Data

(60) Provisional application No. 62/424,560, filed on Nov. 21, 2016.

(51) Int. Cl.
| | |
|---|---|
| *G01S 7/48* | (2006.01) |
| *G01S 7/481* | (2006.01) |
| *G01S 7/484* | (2006.01) |
| *G01S 17/42* | (2006.01) |
| *G01S 17/06* | (2006.01) |

(52) U.S. Cl.
CPC ............ *G01S 7/4813* (2013.01); *G01S 7/484* (2013.01); *G01S 7/4815* (2013.01); *G01S 7/4817* (2013.01); *G01S 17/06* (2013.01); *G01S 17/42* (2013.01)

(58) Field of Classification Search
CPC ........ G01S 17/10; G01S 17/93; G01S 7/4865; G01S 7/4863; G01S 7/4815
See application file for complete search history.

(56) References Cited

U.S. PATENT DOCUMENTS

| | | | |
|---|---|---|---|
| 2006/0000909 A1* | 1/2006 | Knowles | G02B 27/0961 235/454 |
| 2011/0216304 A1 | 9/2011 | Hall | |
| 2014/0268098 A1 | 9/2014 | Schwartz | |
| 2015/0131080 A1* | 5/2015 | Retterath | G01S 17/10 356/5.01 |

\* cited by examiner

*Primary Examiner* — Luke D Ratcliffe
(74) *Attorney, Agent, or Firm* — Shalini Venkatesh

(57) ABSTRACT

An apparatus comprises a horizontal array of emitter/detector pairs; an array of lens pairs mounted above and aligned with emitter/detector pairs; and a first curved reflective surface positioned such that for each emitter/detector pair and corresponding lens pair, light from the emitter that passes through a lens of the lens pair is redirected into the far field, and light arriving from the far field is redirected through the other lens of the lens pair onto the detector. Light from each emitter is emitted upwards along a vertical axis, and light received by each detector is incident on the detector downwards along a vertical axis. If light emitted from the first array and reflected by the first surface into the far field reflects off an object in the far field and returns to the apparatus, the returning light is reflected off the first surface and detected by the first array.

19 Claims, 14 Drawing Sheets

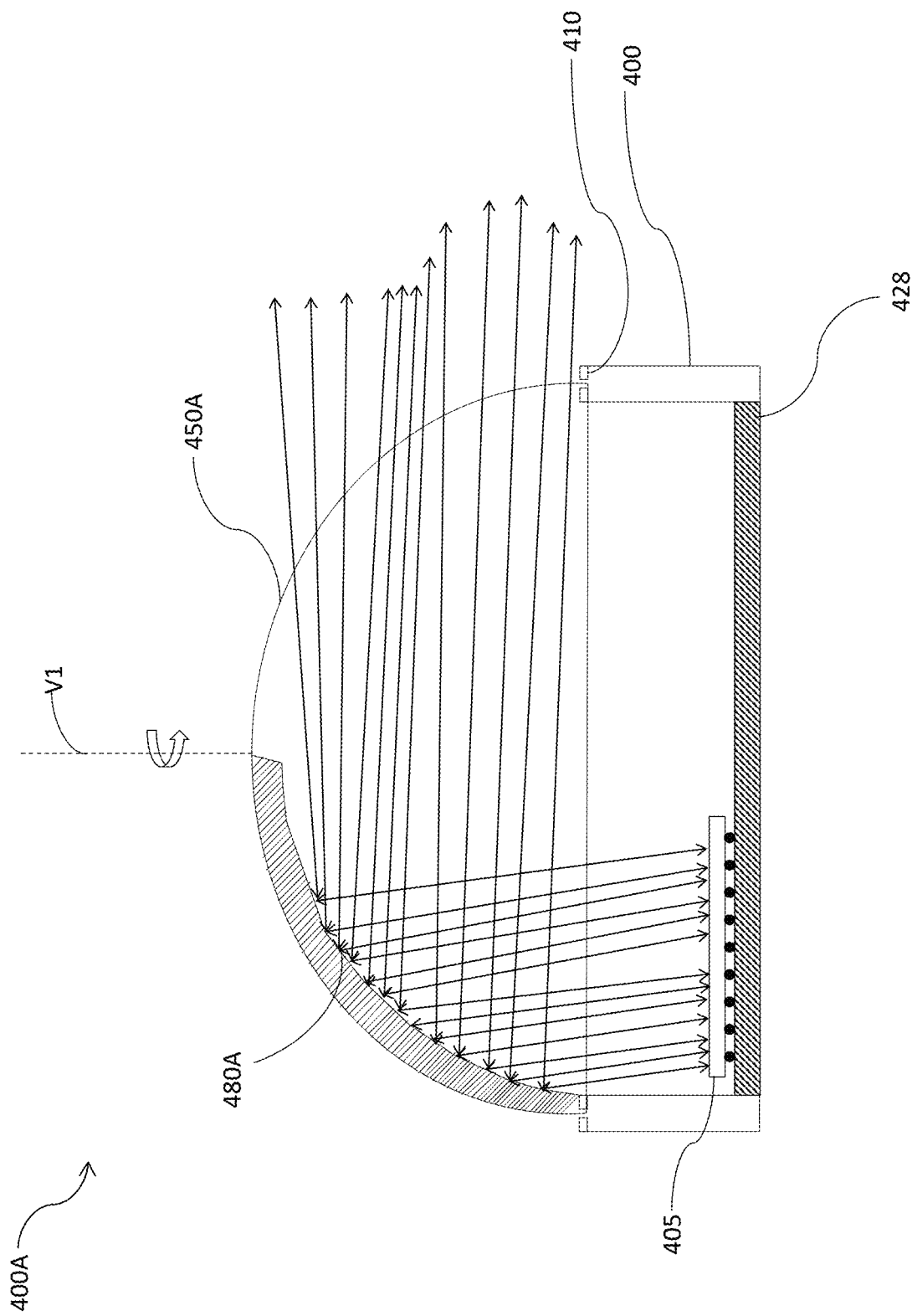

Adding more emitter rows results in filling out density in azimuthal range.

SCANNING LIDAR SYSTEM USING A CURVED ROTATING SURFACE

CROSS REFERENCE TO RELATED APPLICATIONS

This application claims priority to U.S. Provisional Application No. 62/424,560, filed Nov. 21, 2016, which is hereby incorporated by reference, as if set forth in full in this specification

BACKGROUND

Laser imaging detection and ranging (LIDAR) is well known as a high-performance imaging technology, capable of providing accurate 3D mapping in all weather conditions at potentially very large ranges and fields of view. For large volume markets however, such as the automotive industry, currently available LIDAR-based systems are produced using conventional (not solid state) fabrication processes, and therefore require long assembly times, have poor reliability, are relatively large, costly, and hard to adapt for different applications. The theoretically attainable ranges and fields of view are often not achieved in practice.

It is therefore desirable to provide a method for fabricating an optical engine for a LIDAR system suited to high volume markets by offering significant improvements in assembly time, cost, size and reliability. Ideally, an improved optical engine fabricated by such a method would also incorporate innovative optical and optomechanical design features to deliver increases in operational range and field of view.

SUMMARY

The present invention includes an apparatus comprising a first array of emitter/detector pairs positioned on a horizontal plane; a second array of lens pairs mounted vertically above the first array, such that each lens pair is aligned with a corresponding emitter/detector pair; and a first curved reflective surface positioned with respect to the first and second arrays such that for each emitter/detector pair and corresponding lens pair, light emitted from the emitter and passing through a lens of the corresponding lens pair is reflected by the first surface into the far field, and light arriving from the far field is reflected by the first surface and directed through the other lens of the lens pair onto the detector. Each emitter/detector pair comprises an emitter and a detector, light from each emitter being emitted upwards along a vertical axis, and light received by each detector being incident on the detector downwards from a vertical axis. If light emitted from the first array and reflected by the first surface into the far field reflects off an object in the far field and returns to the apparatus, the returning light is reflected off the first surface and detected by the first array.

In one aspect, the curved reflecting surface is attached to a transmissive dome positioned above first and second arrays, such that the curved reflecting surface and the dome are rotatable as a single unit around a vertical axis though the center of the apparatus, while the first and second arrays, positioned with a lateral offset with respect to the central axis, remain stationary within the apparatus.

In one aspect, a method of fabricating a device comprising a first array of emitter/detector pairs and a second array of lens pairs comprises: patterning a substrate with a fiduial marker, location holes and an array of features into or onto which a plurality of emitters and detectors are positioned to provide the first array of emitter-detector pairs, such that when the emitters and detectors are operated and the substrate is in a horizontal patterned side up orientation, light from each emitter is emitted upwards along a vertical axis, and each detector is receptive to light incident downwards from a vertical axis; fabricating the second array of lens pairs with separations between adjacent lens pairs corresponding to separations between adjacent emitter/detector pairs in the first array, and rigidly attaching the second array to a lens holder where the holder includes locator pins configured to mate with the locator holes; and using the locator pins and locator holes to fix the second array into position and orientation with respect to the first array such that each lens pair is precisely aligned with a corresponding underlying emitter/detector pair.

In another aspect, a far field imaging system comprises: a first array of pairs of emitters and detectors arranged along a first linear axis in a first plane, the separations between adjacent emitter/detector pairs varying along the first linear axis; a second array of pairs of lenses aligned to the pairs of emitters and detectors in the first array; an optical assembly comprising a curved reflective optical surface configured to rotate about an axis perpendicular to the first plane; a third array of pairs of emitter drivers and detector amplifiers operably connected to the first array; a fourth array of pairs of analog to digital convertors operably connected to the third array; a control system controlling the first, third and fourth arrays, the control system comprising a processor; a logic device; a memory; a motor driver and controller; and a communications device the emitters and detectors, the optical assembly, and the third and fourth arrays are operated under the control of the control system and the communications device to produce LIDAR data for display on a visualization platform.

BRIEF DESCRIPTION OF THE DRAWINGS

FIG. 4A shows a cross section view through an apparatus according to one embodiment.

DETAILED DESCRIPTION

The manner in which the present invention provides its advantages can be more easily understood with reference to FIGS. 1 through 9.

Figure 1:
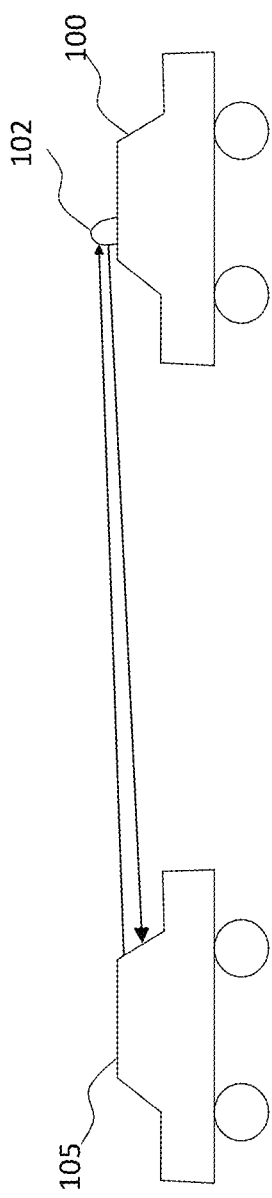
FIG. 1 is a schematic diagram illustrating the basic principles of LIDAR applied to an automative application (Prior Art).

FIG. 1 illustrates an embodiment in which a Light Detection and Ranging (LIDAR) apparatus 102 on an originating vehicle 100 is used to image an object 105 (in the case shown, another car) positioned outside the vehicle. Light waves generated by apparatus 102 on the originating vehicle 100 are reflected off object 105 and captured by LIDAR apparatus 102. Multiple light beams are generated and captured in rapid succession to create an image of object 105.

Figure 2A:
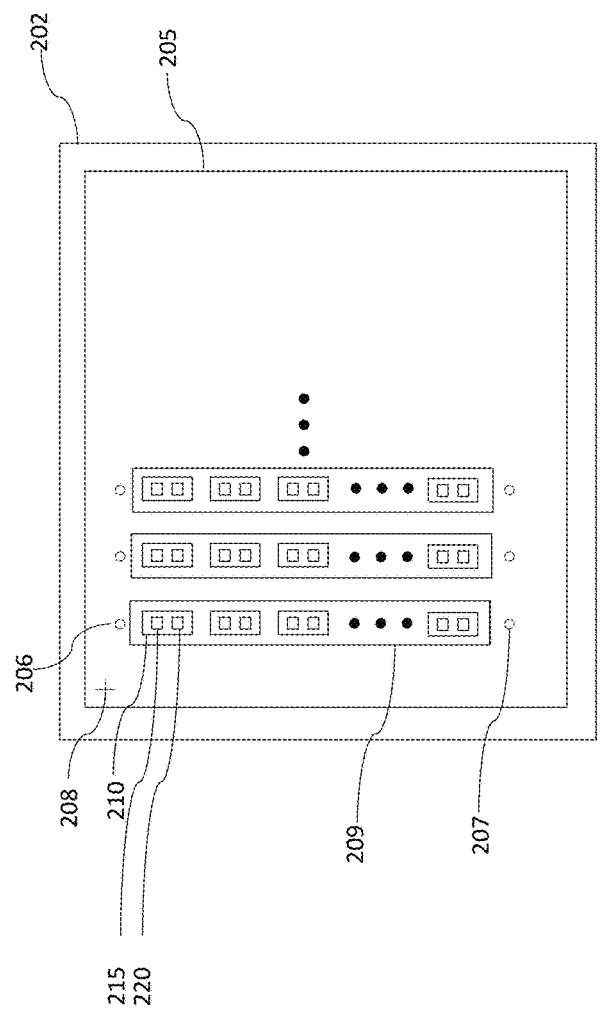
FIG. 2A shows perspective and top-down schematic views of an apparatus according to one embodiment.
Figure 2A:
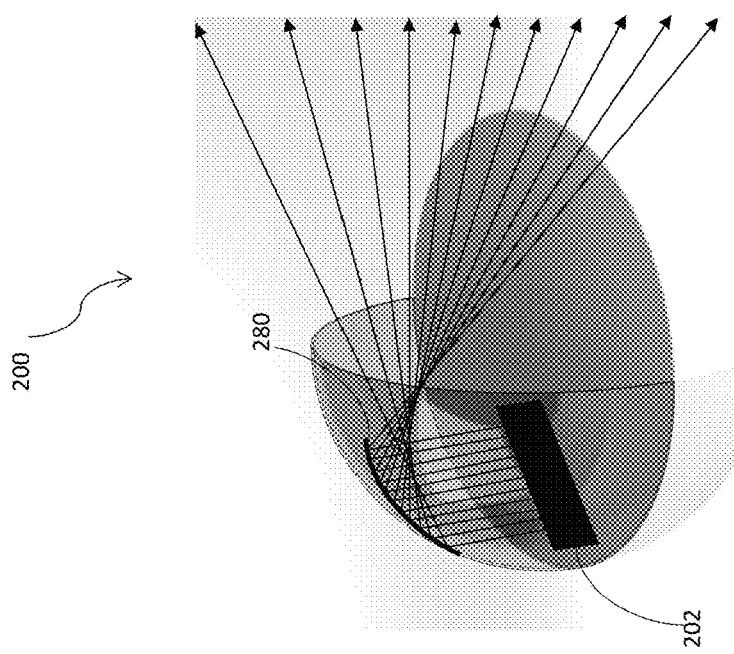

The left-hand side of FIG. 2A shows a perspective view of an apparatus 200 that comprises a special holder 202 that may in some implementations be a high precision device. For example, 202 may include a substrate 205 that has precision machined locations at which an array 209 of emitter and detector pairs 210 are fixed into place. The material of which substrate 205 is composed may, for example, be silicon, or a ceramic, though other material choices are possible. On some implementations, special holder 202 may be dispensed with, and substrate 205 may itself act as the holder. Substrate 205 may include one or more linear arrays 209. In the shown embodiment, multiple linear arrays 209 are present side by side.

The right-hand part of FIG. 2A shows a top down view of emitter-detector pairs 210, each comprising a laser 215 and detector 220, placed at precise locations with respect to a fiducial marker 208 marked on silicon substrate 204. Substrate 205 also includes precisely located and sized locator holes 206, 207. The array 209 of emitter and detector pairs 210 emits light into and receives light from the volume of space immediately above the active areas of the pairs, where a lens array (not shown in this figure but see 300 in FIG. 3, discussed below) is positioned to intercept the light, collimating the light beams as they pass through upwards, and focusing them when they pass through downwards. For the embodiment shown with multiple linear emitter-detector arrays, 209, there will be multiple matching linear lens arrays side by side positioned in a plane parallel to and vertically above the plane of substrate 205 to match the positions of emitter-detector arrays 209.

The desired relative positioning of each lens array and corresponding emitter-detector array 209 is achieved with the use of precisely located and sized locator pins (not shown in this figure but see 330 in FIG. 3, discussed below) either fabricated into or attached to holder 300 (see FIG. 3) which rigidly supports the lens array, as these pins mate with locator holes 206, 207 in substrate 205.

In some embodiments, substrate 205, emitter-detector pairs 210, and the focusing lens array 300 are kept stationary in horizontal planes while an optical element having a curved reflective surface 280 may be rotated about a vertical axis to scan the far field. In some embodiments, a collection of reflective and refractive optical elements combine to provide one effective curved reflective surface 280. In some other embodiments, curved reflective surface 280 is suspended from a transmissive dome positioned above the emitter-detector arrays and lens arrays, such that the curved reflecting surface is rotatable around a vertical axis passing through the arrays to scan the far field, while the emitter-detector arrays, lens arrays, and the dome remain stationary within the apparatus. These embodiments are described in more detail with reference to FIGS. 4A-4D discussed below.

Figure 2B:
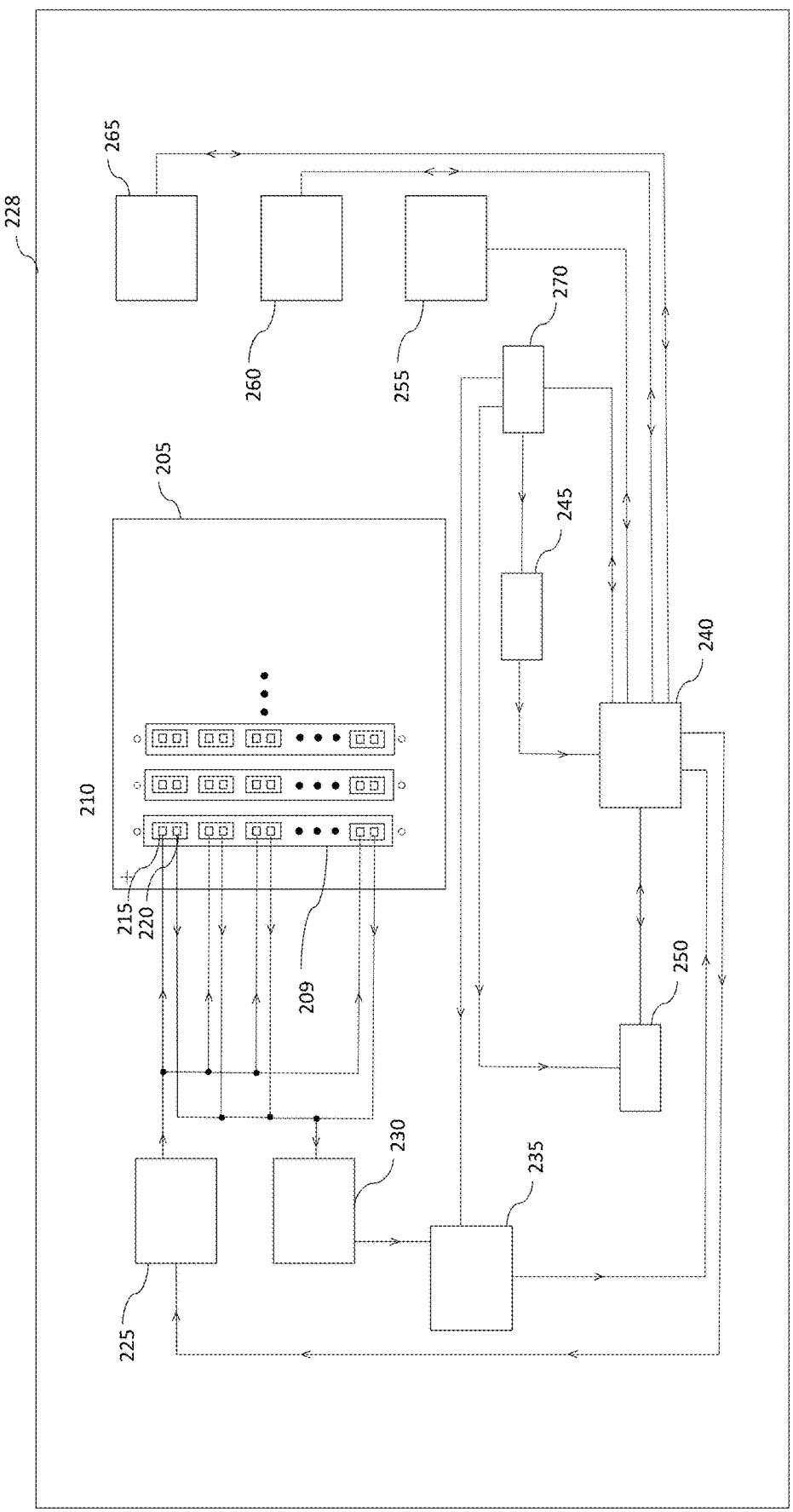
FIG. 2B illustrates a system according to one embodiment

FIG. 2B, which is a schematic depiction of a system according to one embodiment, shows circuit board 228 to which substrate 205 is connected. The electrical connections may be implemented using flip chip bump technology. The emitters 215 are powered and pulsed using a circuitry such as a laser diode driver array 225. The signals generated by detectors 220 are amplified on board 228 by an array of amplifiers 230. Signals from amplifiers 230 are further processed by an Analog to Digital Converter 235 that is shared by multiple detectors 220 using separate channels. Laser Driver array 225 gets instructions from processor 240 to drive multiple emitters 215. Analog to Digital Converter 235 provides data to processor 240. The processor may have a logic device 245 and memory device 250 connected to it for storing instructions and data. The entire system communicates with the outside world using a communication system embodied in sensor communications control block 255. All components 235, 240, 245, 250, 255, 260 and 265 on board 228 are synchronized by a single clock 270.

Since the power for all the emitters and detectors is delivered through low resistance flip chip bumps, the overall power consumption of the system is very low, and SNR and signal path bandwidth are high, relative to other connectivity options.

Figure 3:
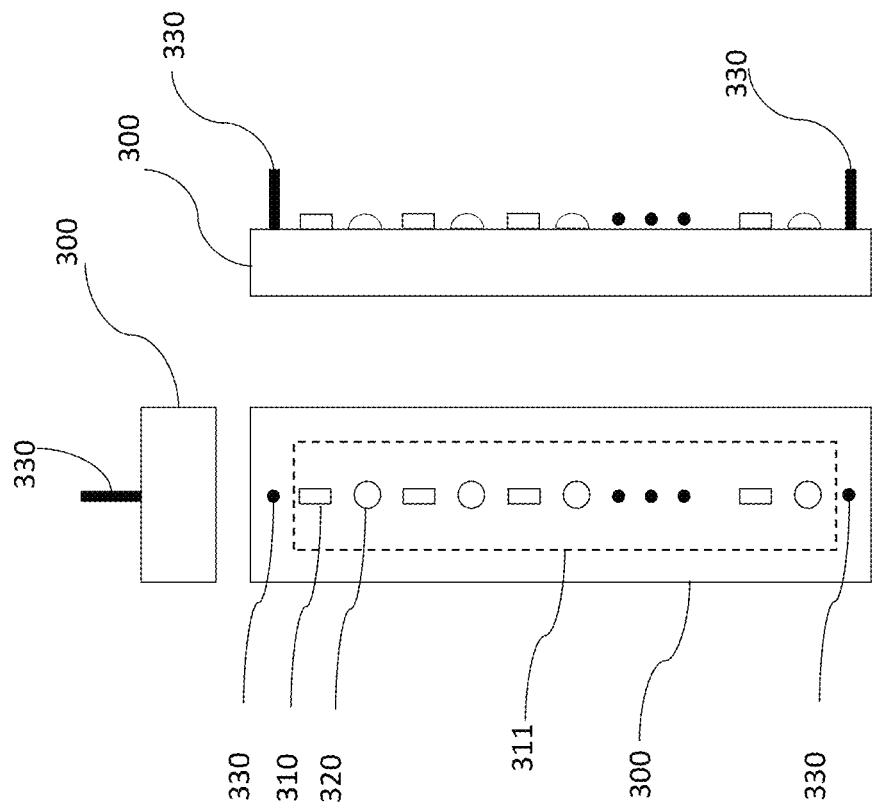
FIG. 3 shows top down, side and end-on views of a lens array in a lens holder according to one embodiment.

FIG. 3 shows top down, side and end-on views of holder 300, in which lens array 311 is held, according to one embodiment. One precisely sized and located locator pin 330 is present at each end of the linear arrangement of lens pairs made up of lenses 310 and 320, each pair of lenses positioned to match up with a corresponding underlying emitter-detector pair when the apparatus is assembled. The side view shows that the shapes of lenses 310 and 320 will differ, as they are configured to act differently on light captured immediately after emission (to form a collimated beam) as opposed to light to be delivered for detection (to focus a collimated beam). Precision molding or precision machining may be used to make lens array 311.

FIG. 4A shows a cross section view through an apparatus 400A according to one embodiment. A single curved reflective surface 480A is provided by an optical element embedded into or otherwise attached to a transparent optical element 450A creating a dome suspended above printed circuit board 428 which in turn is connected to substrate 405, to which the emitter-detector array and lens array (not shown) are attached. During operational LIDAR scanning, the dome including surface 480A is rotated relative to the stationary substrate 405, around central vertical axis V1, using rotation mechanism 410. Mechanism 410 may include a ball bearing equipped linear induction motor, or by a motor of some other type. The emitter-detector arrays attached to substrate 405 of course remain stationary while surface 480A rotates.

The rotating curved surface acts to spread out and direct light beams emitted by the emitter-detector array and collimated by the lens array, so that a corresponding optical pattern, which may in some cases be aspheric, is created in the far field. The non-uniform pattern has a higher density in the middle of the scanned elevation angle and a lower density on the fringes. This is a desirable feature in applications such as automotive LIDAR, as it gives more coverage in the area of interest which is directly ahead of the vehicle.

The optical element that provides curved reflective surface 480A may be made up of reflective and refractive elements, all positioned above stationary substrate 405 and the stationary emitter-detector and lens arrays attached to that substrate. The primary functions of curved reflective surface 480A are to spread out the collimated light rays from the emitters in the horizontal and vertical directions as it sends the rays out of the apparatus, and to gather collimated light rays returning to the apparatus after reflecting off objects in the far field and direct them down to the detectors. The shape of curved surface 480A is designed such that emitter-detector pairs (not shown) can be packed very closely together on substrate 405, while a wide angular range through vertical and horizontal planes in the far field can be addressed. This enables a very compact apparatus with good far field coverage. Far field is defined, throughout this disclosure, as any distance after the curved reflective surface.

It should be noted that the rays of light shown in FIGS. 4A and 4B-4D following are not necessarily shown following the exact paths they would in a real device, but may be merely indicating very roughly and approximately the general directions in which rays would travel.

The close spacing between the emitter and detector of each emitter-detector pair reduces parallax problems in the imaging achieved by embodiments of the present invention. In one embodiment, the spacing is in the range of 750 um to 1000 um. The close spacing also increases the overlap area and reduces the blind spot to typically less than 3 meters from the sensor compared to systems that have emitters and detectors further apart. Using a curved reflective surface rather than a flat one provides a set of overlapping sinusoidal traces or a derivative thereof in the imaging plane, which results in significantly denser coverage of the imaging plane.

Figure 4B:
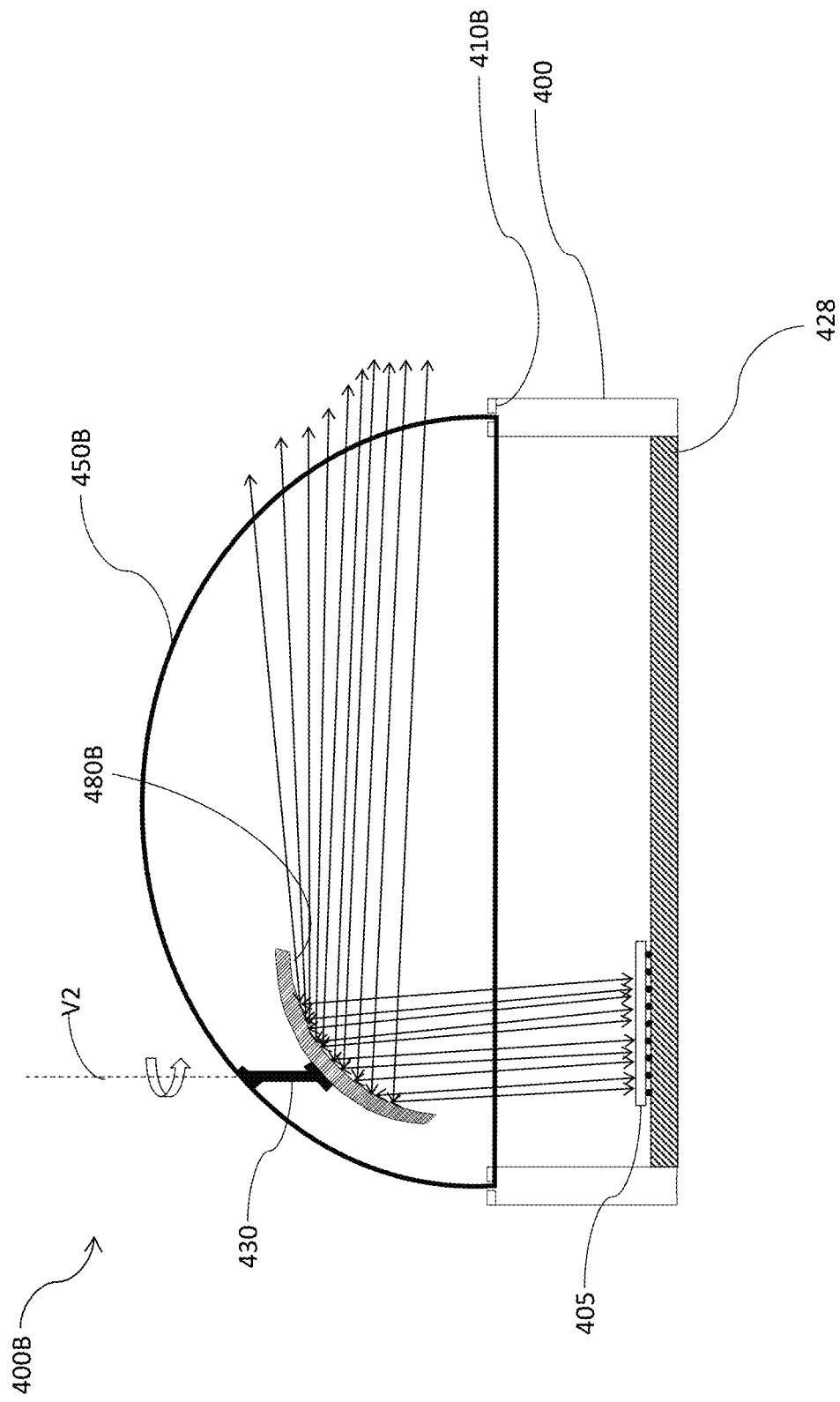
FIG. 4B shows a cross section view through an apparatus according to another embodiment.

FIG. 4B shows a cross section view through an apparatus 400B according to one embodiment. A single curved reflective surface 480B is provided by an optical element suspended from a transparent domed optical element 450B. Dome 450B is attached to printed circuit board 428 which in turn is connected to substrate 405, to which the emitter-detector array and lens array (not shown) are attached. The suspension mechanism 430 is operably connected to a rotation mechanism (not shown) configured to rotate surface 480B relative to the stationary substrate 205, around vertical axis V2 that passes not through the central axis of the dome but is laterally displaced, so that V2 passes through the emitter-detector array. The emitter-detector arrays attached to substrate 405 of course remain stationary while surface 480B rotates. Dome 450B also remains stationary while surface 480B rotates during the active scanning operation of the apparatus, but may be coupled to a separate rotation mechanism 410B, as shown. This allows dome 450B to be rotated occasionally, when the device is not operating in its active scanning mode, simply to shake off any water droplets that may have accumulated on its outer surface, so keeping the optical path clear.

The spreading out and redirection of light rays by curved reflecting surface 480B occurs in a similar way to that discussed above with respect to FIG. 4A, with the difference that in the arrangement of FIG. 4B, the entire 360 degree range of space in the azimuthal plane may be addressed during scanning, all emitter-detector pairs being powered on at the same time, while in the arrangement of FIG. 4A, not all emitter-detector pairs are on at the same time as part of the far-field is "shielded" from the LIDAR rays by the occlusion "shadow" of the optical element providing surface 480A.

Figure 4C:
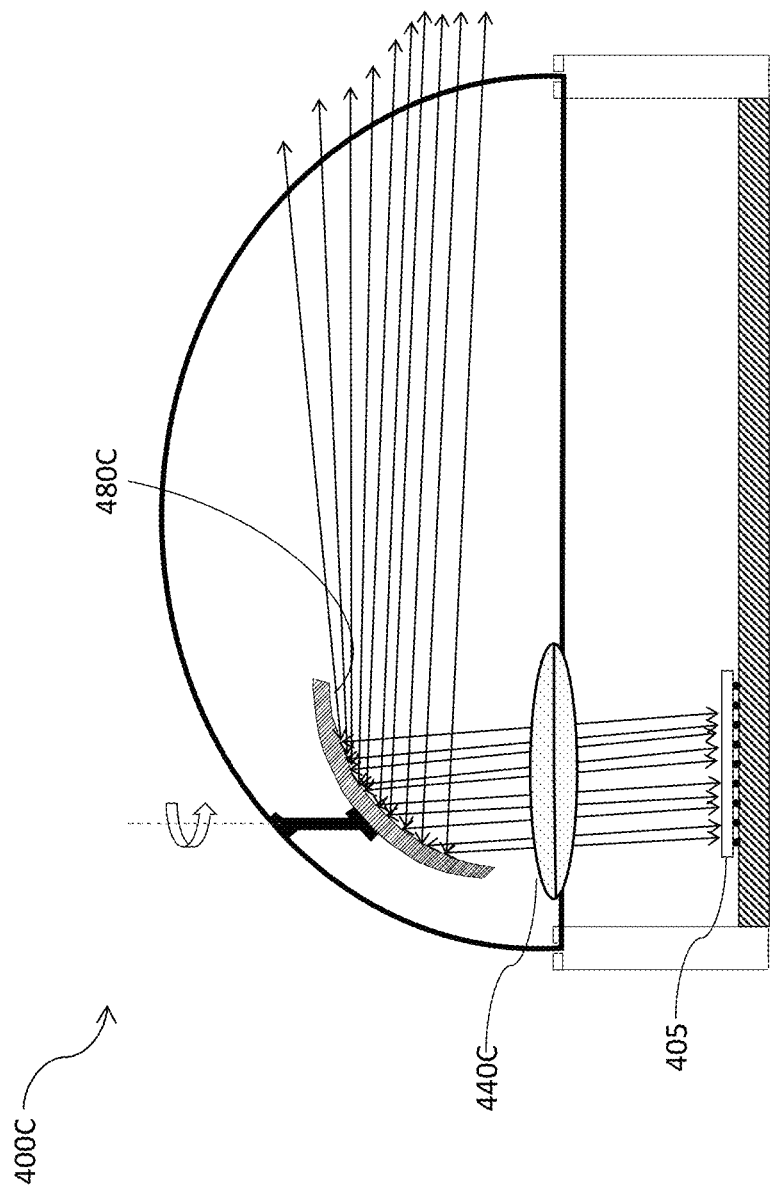
FIG. 4C shows a cross section view through an apparatus according to yet another embodiment.
Figure 4D:
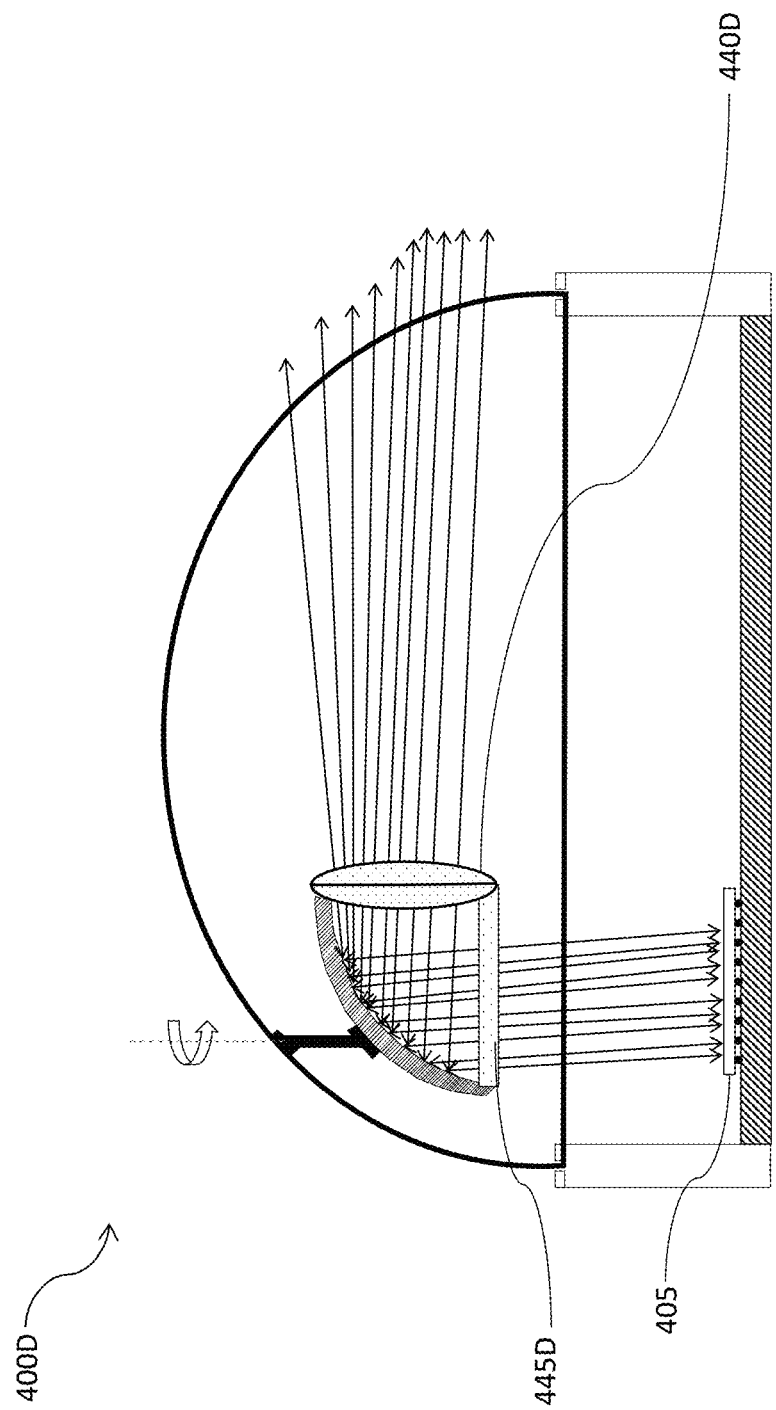
FIG. 4D shows a cross section view through an apparatus according to another embodiment.

FIGS. 4C and 4D show apparatus 400C and 400D respectively, according to two embodiments that are similar to the embodiments of FIG. 4B in operation and structure, with the exception that an additional refractive element is positioned in the paths of the optical rays within the apparatus. In the case of FIG. 4C, lens 440C is positioned below curved reflective surface 480C to operate on the rays between surface 480C and the (unshown) lens arrays which are above the (unshown) emitter-detector on substrate 405. In the case of FIG. 4D, lens 440D is positioned to the side of curved reflective surface 480C to operate on the rays between surface 480C and the far field. Optionally, refractive element 445 may also be present below surface 480D, as shown.

Figures 5A, 5B:
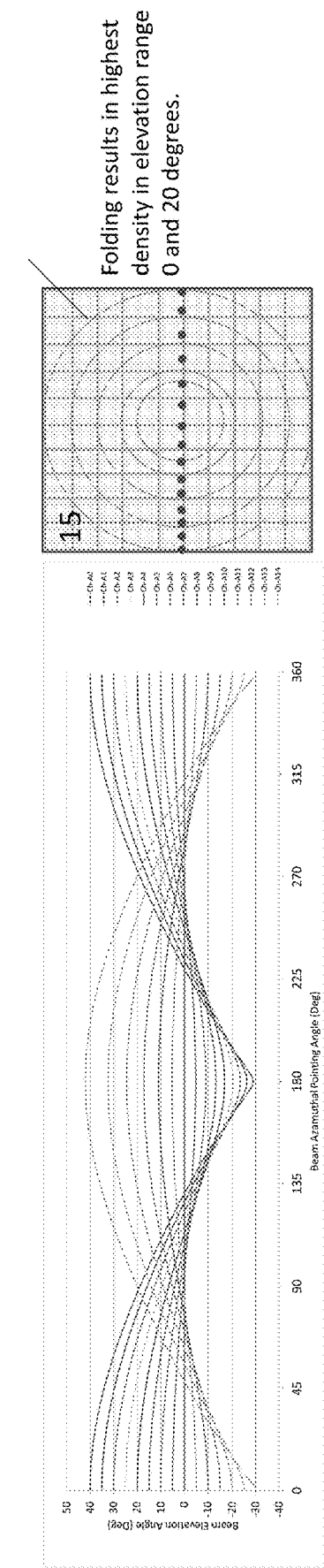
FIG. 5A shows simulation results of far field coverage provided by an arrangement of emitter-detector pairs according to one embodiment.
FIG. 5B shows an arrangement of emitter-detector pairs used to generate the results shown in FIG. 5A.

FIG. 5A shows simulation results of far field coverage provided by an arrangement of emitter-detector pairs as shown in FIG. 5B, an embodiment in which a single linear array of emitter-detector pairs is used, along with a suspended curved reflective surface within the LIDAR apparatus, rotated about an offset vertical axis to scan the emitted collimated beams through 360 degrees. This arrangement corresponds to any of the embodiments of FIGS. 4B-4D.

In FIG. 5A, elevation angle is plotted against azimuthal or pointing angle in the horizontal plane, showing coverage levels. FIG. 5B depicts the arrangement of emitter-detector pairs along the linear axis of the array that generates these plots, showing that the separation between adjacent pairs varies along the axis, being smallest at one end of the array and gradually increasing towards the other end. Each pair (15 pairs are present in the particular example shown, but of course other numbers are possible) is represented by a single dot in this figure, for simplicity. An image of a reflecting object of interest can be reconstructed using matrix multiplication of the emitter plane with the curved reflective surface within the dome. The image projected out is a function of the two defined planes and the distance of the object in the far field from the curved reflecting surface.

Figure 6B:
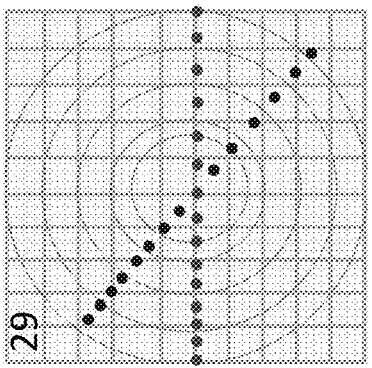
FIG. 6B shows an arrangement of emitter-detector pairs used to generate the results shown in FIG. 6A.
Figure 6A:
FIG. 6A shows simulation results of far field coverage provided by an arrangement of emitter-detector pairs according to another embodiment.

FIG. 6A shows simulation results of far field coverage of a single scan at a single position of the rotating curved reflective surface provided by an arrangement of emitter-detector pairs (and a corresponding arrangement of lens pairs) as shown in FIG. 6B, an embodiment in which two linear arrays of emitter-detector pairs are used, each with variably spaced pairs. As in the case of FIGS. 5A and 5B, a suspended curved reflective surface is assumed to be present within the LIDAR apparatus. In this case, the two arrays are oriented so that they intersect at a central point, at an angle of 45 degrees. FIG. 6B shows plots of elevation angle against azimuthal or pointing angle in the horizontal plane, but this time the coverage levels achieved are more uniform over the 360 degree azimuthal range than generated by the FIG. 5B arrangement. 43 emitter-detector pairs are present in the FIG. 5B arrangement, but of course other two-array embodiments may use any other number of total pairs.

Figure 7B:
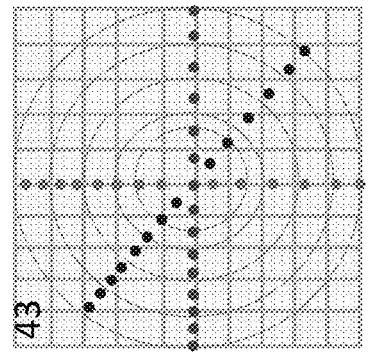
FIG. 7B shows an arrangement of emitter-detector pairs used to generate the results shown in FIG. 7A.
Figure 7A:
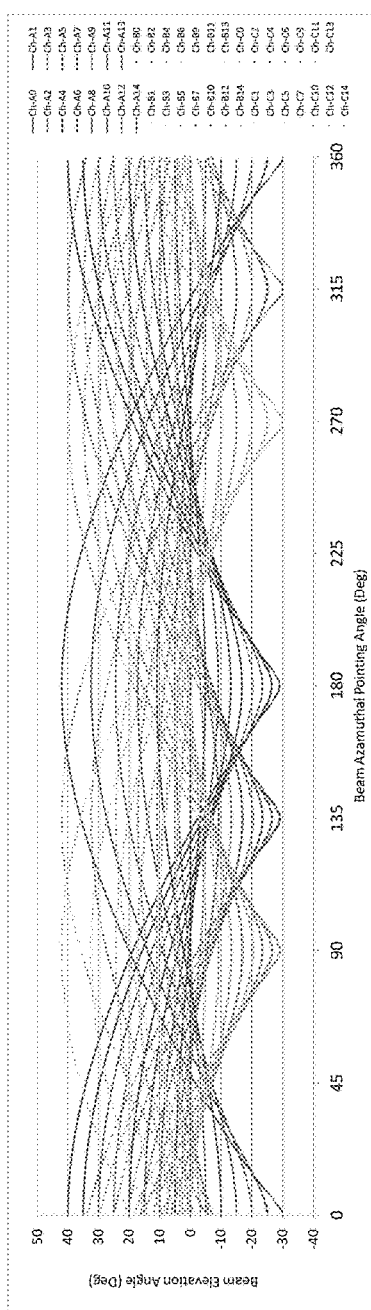
FIG. 7A shows simulation results of far field coverage provided by an arrangement of emitter-detector pairs according to yet another embodiment.

FIG. 7A shows simulation results of far field coverage provided by the arrangement of emitter-detector pairs shown in FIG. 7B, where three linear arrays of variably spaced emitter-detector pairs are used, the remainder of the system simulated being the same as in the cases of FIGS. 5B and 6B. The three arrays are oriented to intersect at a single point, with the second array meeting the first at a 45 degree angle, while the third array meets the first at the at a 90 degree angle. FIG. 7A shows plots of elevation angle against azimuthal or pointing angle in the horizontal plane, showing even more uniform coverage over the 360 degree azimuthal range than generated by the FIG. 6B arrangement.

Figure 8B:
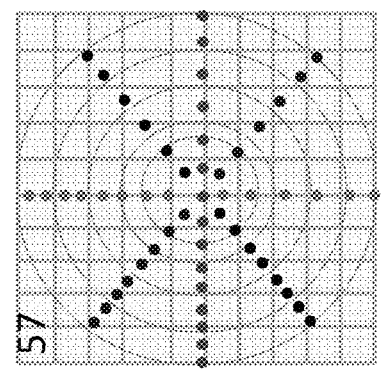
FIG. 8B shows an arrangement of emitter-detector pairs used to generate the results shown in FIG. 8A.
Figure 8A:
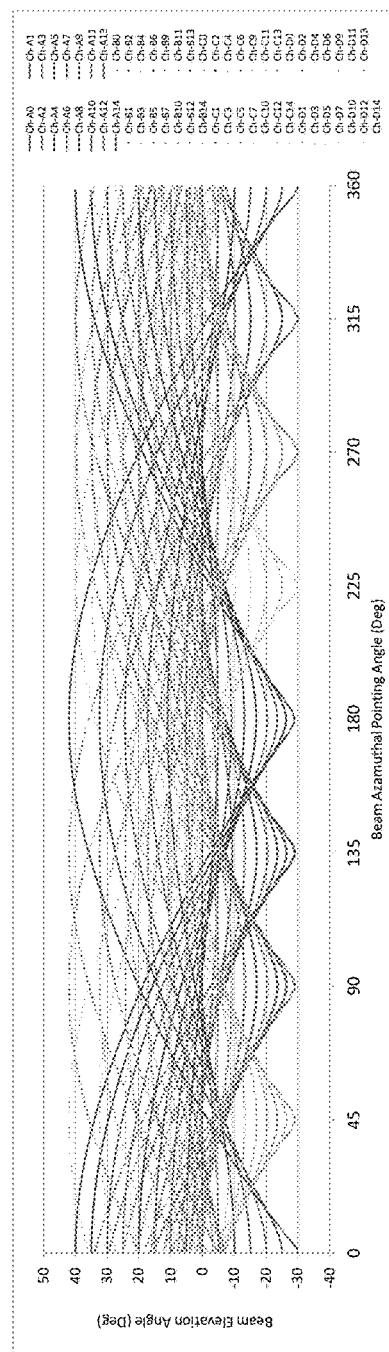
FIG. 8A shows simulation results of far field coverage provided by an arrangement of emitter-detector pairs according to yet another embodiment.

FIG. 8A shows simulation results of far field coverage provided by an arrangement of emitter-detector pairs shown in FIG. 7C, where four linear arrays of variably spaced emitter-detector pairs are used, the remainder of the system simulated being the same as in the case of FIG. 7B. Three of the arrays are oriented just as in the FIG. 7B case, while the fourth array meets the first at the same central point but at an angle of 135 degrees. FIG. 8A shows plots of elevation angle against azimuthal or pointing angle in the horizontal plane, showing even better uniformity of coverage over the 360 degree azimuthal range than achieved with any of the previous three cases.

High peak power pulsed solid state lasers, of the type suited to LIDAR systems of the present invention, require currents in the range of 1 Ampere to dozens of Amperes, sustained for periods from a few nanoseconds to hundreds of nanoseconds. It is desirable to provide a small, local source of this current under the control of an electrical signal which occurs over a larger time scale than that of the current pulse.

A circuit suitable for controlling embodiments of the present invention provides high currents to a laser diode from a magnetic core which is charged through one coil and then discharged through a second coil. By making the charging coil with a larger number of turns than the discharging coil, the circuit can simultaneously increase the instantaneous current available to the laser diode beyond that available from the local power supply and charging switch while scaling up the pulse time of the laser firing control signal relative to the pulse duration of the laser current. The high magnitude, short time span laser current pulse circuit is thus restricted to a single coil and the laser diode itself. The corresponding magnetic core charging current pulse is reduced in magnitude by the turns ratio of the laser driving coil versus the charging coil and the charging voltage, as seen by the laser diode, is scaled down to a negative voltage too small to cause breakdown in the laser diode. The laser firing time is scaled up by the charging coil turns ratio, allowing the charging time to be a more easily adjusted and transmitted pulse of longer duration.

Figure 9:
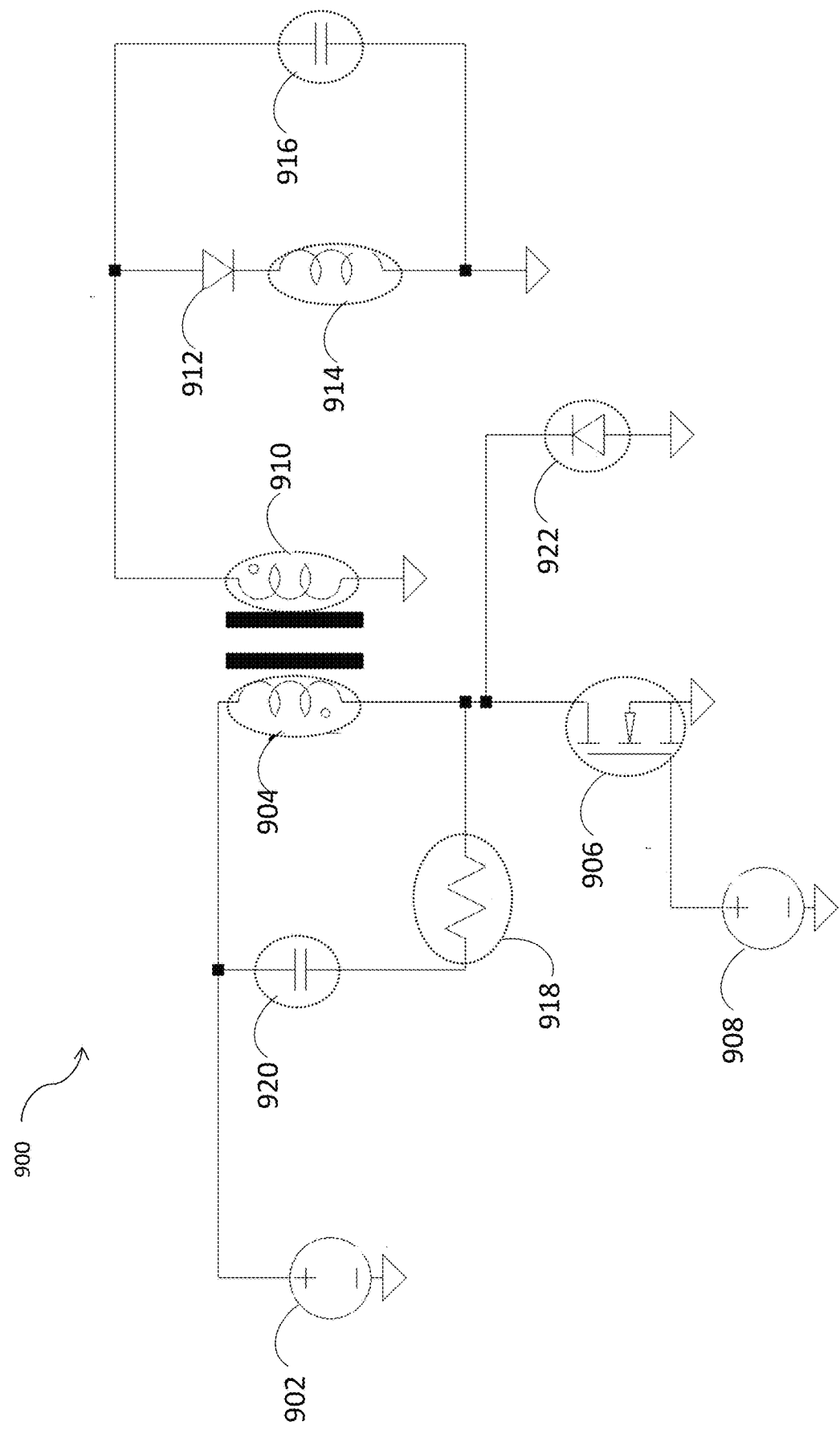
FIG. 9 illustrates a circuit controlling a system according to one embodiment.
Figure 10:
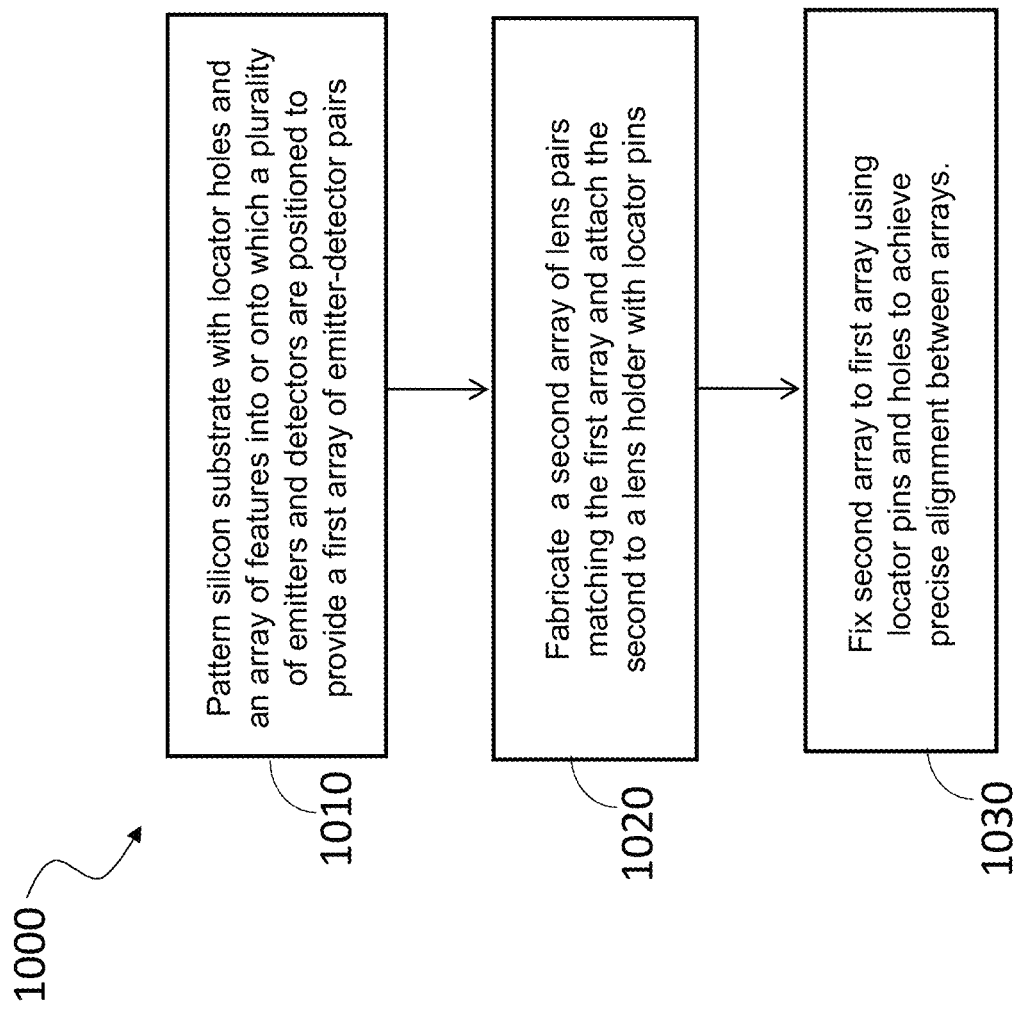
FIG. 10 is a flowchart of a method of fabricating a device according to one embodiment.

FIG. 9 shows an example circuit 900 consisting of a fixed voltage power source 902, a magnetic core charging coil 904, an electronic switch 906, a laser charge 'control voltage' source 908, a laser driving coil 910, and a laser diode 912. The other components in the figure include representations of parasitic inductance 914 and parasitic capacitance 916 associated with laser diode 912 as well as optional damping elements of the charging circuit; 918, 920 and 922.

In circuit 900, a laser pulse is produced by raising the voltage provided by source 908 sufficiently to ensure closure of switch 906. As a result, current begins to flow through inductor 904, increasing at a rate proportional to the inductance of 904 and the magnitude of the voltage of source 902. When enough energy has been stored in the magnetic core to achieve the desired laser discharge, the voltage at source 908 is dropped to a voltage low enough to ensure that switch 906 opens. While 906 is closed, a negative voltage is produced across laser diode 912 by inductor 910, the inductance of which is small enough to ensure that laser diode 912 does not conduct in a 'reverse' direction. As soon as switch 906 is opened, the voltage across 910 will be reversed and, with no current path through 904, all the energy in the magnetic core will pass out of 910 as a positive current, with the voltage across 910 rising to whatever voltage is required to deliver that current to laser diode 912. When the energy of the core has been exhausted, the laser current pulse will end, completing the laser firing cycle.

In one embodiment, a method 1000 of fabricating a device such as apparatus 200 comprises the following steps. In step 1010, a substrate is patterned with at least two locator holes, a fiducial marker and an array of features into or onto which a plurality of emitters and detectors are positioned to provide a first array of emitter-detector pairs, such that when the emitters and detectors are operated and the substrate is in a horizontal patterned side up orientation, light from each emitter is emitted upwards along a vertical axis, and each detector is receptive to light incident downwards from a vertical axis. In some embodiments, the substrate is silicon, a material for which high precision fabrication technology is well developed.

In step 1020, a second array of lens pairs is fabricated with separations between adjacent lens pairs corresponding to separations between adjacent emitter/detector pairs in the first array, and the second array is rigidly attached to a lens holder where the holder includes locator pins configured to mate with the locator holes. In step 1030, the locator pins and locator holes are used to fix the second array into position and orientation with respect to the first array such that each lens pair is precisely aligned with a corresponding underlying emitter/detector pair.

In an alternative embodiment (not shown) instead of fabricating the second array of lens pairs after step 1010, instead of step 1020, lenses may be formed and positioned separately on a second substrate, only forming an array when they are in place on that substrate, which may then act as a lens holder or be placed within a lens holder before step 1030 is carried out.

Embodiments described herein provide various benefits. In particular, embodiments provide for LIDAR systems that not only outperform currently available systems produced for comparable applications, but do so at lower cost, more compactly, and with higher production yield, and higher operational reliability. A large part of the cost, yield, and reliability advantages is achieved by using high precsion fabrication technology (for example, based on silicon substrates) and passive alignment techniques (locator pins and holes) to assemble the array of emitter-detector pairs, and to fix the lens array in place, relative to the emitter-detector array, at high precision. Another part is provided by the fact that the active optical elements are kept stationary (relative to the vehicle in which the system is mounted) with only a passive reflective surface being rotated to provide scanning of the far field. Finally, the curvature of the reflective surface helps to keep the apparatus size relatively compact.

Performance advantages of the present invention regarding the LIDAR imaging capabilities primarily include improved field of view in horizontal and vertical planes, and the potential for more uniform coverage through a full span of 360 degrees around the azimuth. These advantages are provided by careful design of the curved reflective surfaces, and innovative arrangements, which may simply be the variable spacing of emitter-detector pairs within single linear arrays, or which may additionally include the use of multiple linear arrays of those emitter-detector pairs in a radial spoked pattern. The angular separation of the spokes may be adjusted to achieve desired levels of coverage, with the 45 degree cases presented being merely one option.

These benefits are likely to be particularly valuable in automotive LIDAR applications, but other applications such as drone guidance may easily be envisaged.

The above-described embodiments should be considered as examples of the present invention, rather than as limiting the scope of the invention. Various modifications of the above-described embodiments of the present invention will become apparent to those skilled in the art from the foregoing description and accompanying drawings. Accordingly, the present invention is to be limited solely by the scope of the following claims.

The invention claimed is:

1. An apparatus comprising:
   a first array of emitter/detector pairs positioned on a horizontal plane; wherein each emitter/detector pair comprises an emitter and a detector, light from each emitter being emitted upwards along a vertical axis, and light received by each detector being incident on the detector downwards from a vertical axis;
   a second array of lens pairs mounted vertically above the first array of emitter/detector pairs, such that each lens pair is aligned with a corresponding emitter/detector pair; and
   a curved reflective surface positioned with respect to the first array of emitter/detector pairs and the second array of lens pairs such that for each emitter/detector pair and corresponding lens pair, light emitted from the emitter and passing through a first lens of the corresponding lens pair is reflected by the curved reflective surface into the far field, and light arriving from the far field is reflected by the curved reflective surface and directed through a second lens of the lens pair onto the detector; wherein if light emitted from the first array and reflected by the curved reflective surface emerges from the apparatus, reflects off an object located at a distance from the apparatus sufficiently great that wavefronts of the emitted light reaching the object are essentially planar and flat, and returns to the apparatus, the returning light is reflected off the curved reflective surface and detected by the first array.

2. The apparatus of claim 1, wherein the curved reflecting surface is attached to a transmissive dome positioned above the first array of emitter/detector pairs and the second array of lens pairs, such that the curved reflecting surface and the transmissive dome are rotatable as a single unit around a vertical axis though the center of the apparatus, while the first array of emitter/detector pairs and the second array of lens pairs, positioned with a lateral offset with respect to the vertical axis, remain stationary within the apparatus.

3. The apparatus of claim 1, wherein the curved reflecting surface is suspended from a transmissive dome positioned above the first array of emitter/detector pairs and the second array of lens pairs, such that the curved reflecting surface is rotatable around a vertical axis passing through the first and second arrays, while the first and second arrays and the transmissive dome remain stationary within the apparatus.

4. The apparatus of claim 1, wherein the emitters of the first array of emitter/detector pairs are configured to produce light within a range of selectable levels of intensity and the detectors of the first array of emitter/detector pairs are configured to receive light within a range of selectable levels of sensitivity.

5. The apparatus of claim 1, wherein multiple emitters and detectors of the first array of emitter/detector pairs are simultaneously or sequentially active.

6. The apparatus in claim 3, wherein the curved reflecting surface is rotatable through 360 degrees such that objects of interest situated in space around the apparatus at any radial angle with respect to a vertical axis through the apparatus may be addressed by light emitted from the apparatus.

7. The apparatus in claim 3, wherein a rotation angle through which the curved reflecting surface moves is measured using a graduated scale and a dedicated emitter/detector system.

8. The apparatus in claim 1, wherein the first array of emitter/detector pairs comprises a first group of emitter/detector pairs arranged along a first linear axis in a first plane, the separations between adjacent emitter/detector pairs varying along the first linear axis.

9. The apparatus in claim 8, wherein the first array of emitter/detector pairs additionally comprises a second group of emitter/detector pairs arranged along a second linear axis in the first plane, the second linear axis intersecting the first linear axis at a central point at a fixed angle greater than 0 degrees and less than or equal to 90 degrees, the separations between adjacent emitter/detector pairs in the second group varying along the second linear axis.

10. The apparatus in claim 8, wherein the first array of emitter/detector pairs additionally comprises second, third and fourth groups of emitter/detector pairs arranged along second, third, and fourth linear axes respectively in the first plane, the first, second, third, and fourth axes intersecting at a central point, such that the angular orientations of the second, third and fourth axes relative to the first axis are 45 degrees, 90 degrees, and 135 degrees respectively; and wherein separations between adjacent emitter/detector pairs in the second, third, and fourth groups vary along corresponding linear axes.

11. The apparatus in claim 1, wherein the first array of emitter/detector pairs is supported on a substrate having locator holes and a fiducial marker, and the second array of lens pairs is held in a lens holder having locator pins configured to mate with high precision with the locator holes.

12. A method of fabricating a device comprising a first array of emitter/detector pairs, and a second array of lens pairs, the method comprising:
   patterning a substrate with a fiducial marker, locator holes and an array of features into or onto which a plurality of emitters and detectors are positioned to provide the first array of emitter-detector pairs, such that when the plurality of emitters and detectors are operated and the substrate is in a horizontal patterned side up orientation, light from each emitter is emitted upwards along a vertical axis, and each detector is receptive to light incident downwards from a vertical axis;
   fabricating the second array of lens pairs with separations between adjacent lens pairs corresponding to separations between adjacent emitter/detector pairs in the first array of emitter/detector pairs, and rigidly attaching the second array of lens pairs to a lens holder where the lens holder includes locator pins configured to mate with the locator holes; and
   using the locator pins and locator holes to fix the second array of lens pairs into position and orientation with respect to the first array of emitter/detector pairs such that each lens pair is precisely aligned with a corresponding underlying emitter/detector pair.

13. The method of claim 12, additionally comprising:
   positioning and orienting a curved reflecting surface with respect to the first array of emitter/detector pairs and the second array of lens pairs such that for each emitter/detector pair, light emitted from the emitter and passing through a first lens of the corresponding lens pair reflects off the curved reflective surface into the far field on a first path, and light arriving from the far field along the first path in a reverse direction to reach the device reflects off the curved reflective surface and is directed through a second lens of the lens pair onto the detector.

14. The method of claim 13 wherein positioning and orienting the curved reflective surface comprises:
attaching the curved reflective surface to a transmissive dome to form a single domed unit positioned above first and second arrays; and
attaching the single domed unit to a rotation mechanism included within the device, such that the domed unit is rotatable around a vertical axis through the center of the device, while the first array of emitter/detector pairs and the second array of lens pairs, positioned with a lateral offset with respect to the vertical axis, remain stationary within the device.

15. The method of claim 13, wherein positioning and orienting the curved reflective surface comprises:
suspending the curved reflective surface from a transmissive dome positioned above the first array of emitter/detector pairs and the second array of lens pairs; and
attaching the curved reflective surface to a rotation mechanism included within the device, such that the curved reflective surface is rotatable around a vertical axis passing through the first and second arrays, while the first and second arrays and the transmissive dome remain stationary within the device.

16. A far field imaging system comprising:
a first array of pairs of emitters and detectors arranged along a first linear axis in a first plane, the separations between adjacent emitter/detector pairs varying along the first linear axis;
a second array of pairs of lenses aligned to the pairs of emitters and detectors in the first array;
an optical assembly comprising a curved reflective optical surface configured to rotate about an axis perpendicular to the first plane;
a third array of pairs of emitter drivers and detector amplifiers operably connected to the first array;
a fourth array of analog to digital convertors operably connected to the second array;
a control system controlling the first array of pairs of emitters and detectors, the third array of pairs of emitter drivers and detector amplifiers, the fourth array of analog to digital convertors, and the optical assembly, the control system comprising a processor; a logic device; a memory; a motor driver and controller; and
a communications device;
wherein the emitters and detectors, the optical assembly, the emitter drivers and detector amplifiers, and the analog to digital converters are operated under the control of the control system and the communications device to produce LIDAR data for display on a visualization platform.

17. The far field imaging system of claim 16, wherein the first array of pairs of emitters and detectors additionally comprises a second group of emitter-detector pairs arranged along a second linear axis in the first plane, the second linear axis intersecting the first linear axis at a fixed first angle greater than 0 degrees and less than or equal to 90 degrees, the separations between adjacent emitter/detector pairs in the second group of emitter-detector pairs varying along the second linear axis.

18. The far field imaging system of claim 17, wherein the first fixed angle is 45 degrees.

19. The far field imaging system of claim 16, wherein the first array of pairs of emitters and detectors additionally comprises second, third and fourth groups of emitter/detector pairs arranged along second, third, and fourth linear axes respectively in the first plane, the first, second, third, and fourth linear axes intersecting at one central point, such that the angular orientations of the second, third and fourth linear axes relative to the first axis are 45 degrees, 90 degrees, and 135 degrees respectively.

* * * * *